United States Patent [19]
Myers et al.

[11] Patent Number: 5,867,307
[45] Date of Patent: Feb. 2, 1999

[54] BLUR FILM ASSEMBLY FOR INFRARED OPTICAL APPLICATIONS

[75] Inventors: James R. Myers; David R. Smith; Daniel W. Brunton; Stephen M. Jensen; Nicholas B. Saccketti; Scott W. Sparrold; Lawrence A. Westhoven, all of Tucson, Ariz.

[73] Assignee: Raytheon Company, El Segundo, Calif.

[21] Appl. No.: 748,586

[22] Filed: Nov. 13, 1996

[51] Int. Cl.⁶ ..................................... G02B 1/00
[52] U.S. Cl. .................... 359/350; 359/599; 250/351
[58] Field of Search ................... 359/350, 353, 359/557, 599; 250/332, 350, 351

[56] References Cited

U.S. PATENT DOCUMENTS

| | | | |
|---|---|---|---|
| 5,051,591 | 9/1991 | Trotta et al. | 250/351 |
| 5,373,151 | 12/1994 | Eckel, Jr. et al. | 250/332 |
| 5,696,630 | 12/1997 | Hayashi | 359/599 |

*Primary Examiner*—Cassandra C. Spyrou
*Assistant Examiner*—Darren E. Schuberg
*Attorney, Agent, or Firm*—David W. Collins; Leonard A. Alkov; Glenn H. Lenzen, Jr.

[57] ABSTRACT

A blur film is made of a polymeric film material transmissive to infrared energy of a selected waveband, which is affixed to a surface of a substrate transmissive to energy of the same selected infrared waveband. The blur film has a texture or a plurality of lenslets thereon, where the surface of each lenslet is a surface of revolution. In a spatial-filter wheel application, the blur film and substrate are affixed to a support, which in turn is rotatably mounted on a drive. The support is structured such that a portion of its circumference is covered by the blur film and a portion of its circumference is not covered by the blur film. The spatial-filter wheel is rotated in front of a detector to produce alternating blurred and direct images on the detector.

14 Claims, 5 Drawing Sheets

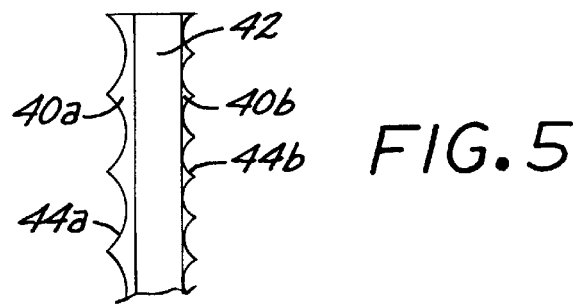
FIG.5
FIG.6
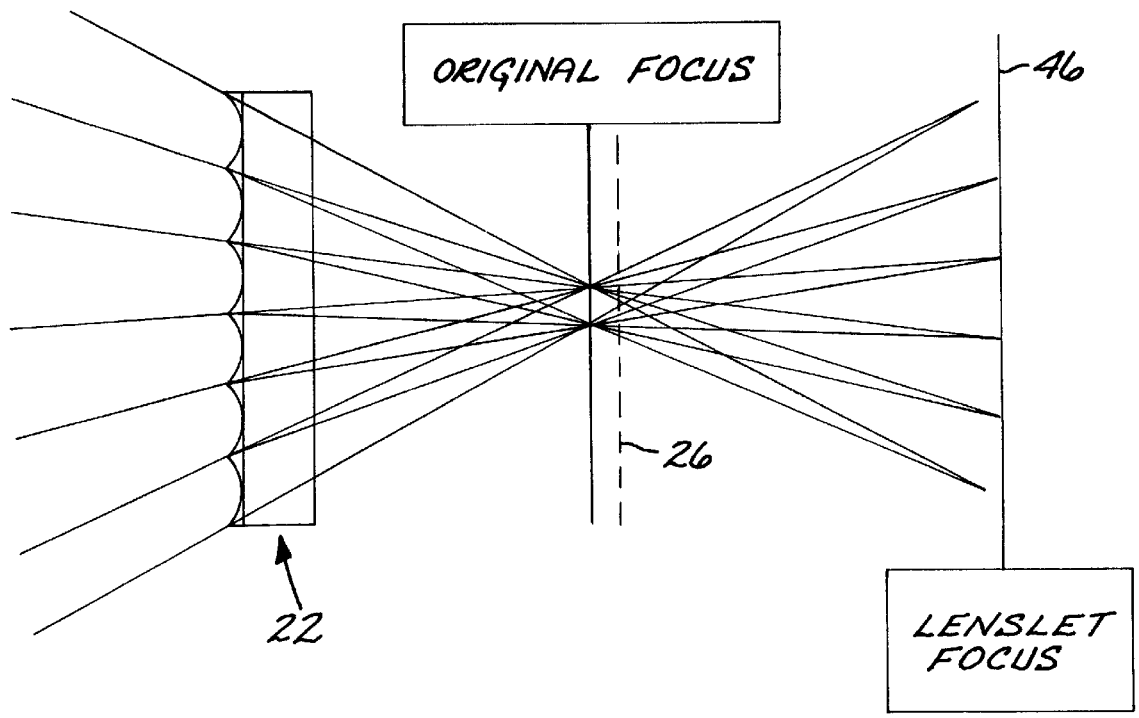
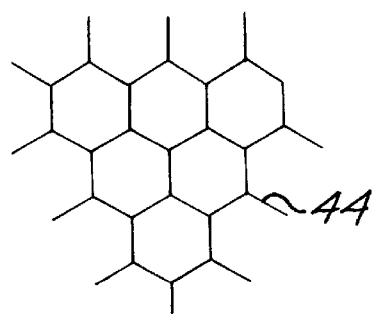
FIG.7

BLUR FILM ASSEMBLY FOR INFRARED OPTICAL APPLICATIONS

BACKGROUND OF THE INVENTION

This invention relates to an imaging optical sensor, and, more particularly, to a blur film assembly utilized in the calibration of an infrared imaging optical sensor.

In one commonly encountered configuration, an imaging infrared (IR) optical sensor (i.e., a focal plane array or FPA detector) consists of a large number, typically thousands or tens of thousands, of individual electro-optic detector elements, which are positioned at the focal plane of the optical system. The detector elements view a scene through an appropriate optical path. The materials and/or construction of the detector elements may be selected to be sensitive to different wavelength ranges (wavebands) of electromagnetic radiation, including, for example, infrared energy. The detector elements are arranged in a planar array, with each detector element providing one pixel of an image. The outputs of the detector elements are digitally processed to form a recreation of the image which may be further analyzed.

Ideally, all of the detector elements would respond identically to incident energy, with the signal output of each detector element identically proportional to the incident energy. In practice within the limitations of current technology, however, each of the different detector elements may be expected to respond slightly differently. Changes in the pixel responses may also develop in the detector array with time or with use. These differences may be evident as gain or zero-point offsets, nonlinearity, or other types of departures from the ideal identical response. As a result of such departures, if a perfectly uniform, infrared input scene were presented to the FPA detector, the detector output would not be perfectly uniform. A variety of techniques are known for both reducing the departure from the ideal in the mass-produced detector elements during production, and also for compensating for non-ideal responses which develop during service. The present invention is concerned with the electronic compensation for non-ideal responses of detector elements which are present in the detector as initially manufactured or which develop in the detector over time and use.

If a scene of uniform energy is viewed by many detector elements during a calibration period and their electrical outputs are different, compensation may be made by adjusting either the zero point and/or the gain of the output of each detector element to achieve an identical output response. This calibration adjustment to the zero point and/or gain is maintained when the scene of interest is later viewed. The overall output radiance of the uniform energy scene during calibration should be approximately that encountered when the scene of interest to the application is viewed, because the departures from non-ideal responses are intensity dependent. In a laboratory setting, then, calibration of the infrared detector elements may be accomplished by providing a uniform calibration energy field separate from the scene, detecting the average radiance of the scene, adjusting the output radiance of the calibration energy source to that of the average radiance of the scene, viewing the calibration energy source with the individual detector elements, and adjusting the zero point and/or gain of the individual detector elements which depart from their ideal electrical output.

In some sensor applications, it is not practical to have available a separate uniform energy source which may be viewed by the detector array. In a missile seeker, for example, there is physically not sufficient space for a separate calibration energy source and the optical path required to direct the output of the energy source onto the detector array during a calibration period.

A blurring technique has been previously developed for application in such situations. During calibration, the view of the scene is controllably blurred over a group of detector elements. In blurring, the scene energy containing relatively high spatial energy frequency components is spread or diffused to produce a blurred image having a more uniform energy level. Any measured high spatial frequency that remains is thus due to the detector elements' non-uniform responses and is driven to zero by electronic compensation. The average radiance of the blurred image approximates that of the scene, and therefore best optimizes the system for the operating conditions. Calibration proceeds as described above.

The controlled blurring of the scene presents a challenge, and a variety of techniques have been used. For example, with one known approach, the scene is viewed by the detector array through two optically transparent elements of different optical path lengths (thickness and/or refractive index). One element is selected such that the image is focused onto the focal plane of the detector array, and the other element (used for calibration) is selected such that the focus is longitudinally displaced from the focal plane of the detector array. While operable, in practice it has been found for infrared sensors that the blurring is insufficient, and that relatively high spatial frequency features of the scene may still be discerned, which prevents accurate calibration of the FPA pixel response.

There is a need for an improved approach to the calibration in service of focal plane array detectors, particularly in systems with restrictive space constraints such as infrared missile seekers. The present invention fulfills this need, and further provides related advantages.

SUMMARY OF THE INVENTION

This present invention provides a new approach to the calibration of an infrared focal plane array detector using a blurring technique. The blurring is achieved with a structure that is robust, light in weight, and small in size, such that it readily fits within a compact sensor system. The degree of blurring is preselectable over a wide range through the fabrication parameters of the blurring structure. The blurring structure is simple and reliable, and inexpensive to produce. It may be adapted for use in a wide variety of infrared optical systems.

In accordance with the invention, a blur film assembly comprises a blur film made of a film material, preferably a polymer, transmissive to infrared energy of a selected waveband. The blur film has a textured surface thereon, preferably in the form of a plurality of lenslets arranged in a regular array. The surface of each lenslet is a locally curved surface-of-revolution, preferably a concave spherical segment, which acts as a miniature lens to alter the ray path of energy passing therethrough. (The surface of revolution is a circularly symmetric surface such as a spherical or aspherical segment.) The blur film is preferably affixed to a substrate made of a substrate material transmissive to infrared energy of the same selected waveband as the film, to mechanically support the blur film. The blur film and the substrate must be transparent to the selected waveband of interest, but they may be transparent to other wavelengths as well without adversely affecting the approach of the invention.

In the preferred application, the substrate is affixed to the support in the form of a flat-disk spatial-filter wheel (sometimes termed a "filter wheel"). The spatial-filter wheel has a circumferentially extending first sector of an annulus, at a selected radial location, covered by the film material, and a circumferentially extending second sector of the same annulus not covered by the film material. The spatial-filter wheel is placed between the scene and detector array and driven in a rotational manner such that for a portion of the rotation of the spatial-filter wheel the scene is viewed by the detector through the blur film material, and for a portion of the rotation the scene is viewed without blurring.

The blur film has a textured surface that serves to diffuse (i.e., evenly spread over an area) the image scene. The preferred textured surface utilizes lenslets, but other surface textures may be appropriate depending upon the nature of the calibration. In the preferred approach, the lenslets blur the scene in a predetermined manner. The curvature, depth, size, spacing, and positioning of the lenslets determine the degree of blurring, and these parameters are readily established during manufacture according to the invention. The present invention is not concerned with selecting precise values for these parameters, which are chosen by optical designers to be compatible with each specific application. Instead, the present approach provides the optical designers with the ability to specify blur films having specific blurring parameters varying over wide ranges in a predetermined manner responsive to the needs of a particular system.

Further in accordance with the invention, a method of fabricating a blur film assembly was developed. The preferred approach comprises the steps of providing a positive primary master tool having a suitably textured surface, preferably a plurality of lenslets, which is subsequently replicated as the final blur film assembly by a two-step replication process. Each lenslet feature comprises a surface having a locally curved surface of revolution. A negative secondary master is replicated from the primary master tool, and a positive polymeric blur film is replicated from the negative secondary master. The negative secondary master may be replicated from the primary master tool either by contacting a thin sheet of polymeric material to the primary master tool and conforming the piece of material to the primary master tool under heat and pressure, or by casting the polymeric material to the face of the primary master tool.

The positive polymeric blur film is replicated from the negative secondary master. In a preferred approach, the blur film is replicated directly onto the surface of the spatial-filter wheel. The negative secondary master is placed against the filter wheel substrate and a liquid polymer, having suitable infrared transparency, is molded between these surfaces. The liquid polymer is cured and the secondary master is removed, leaving the filter wheel with the final blur film applied thereto. In another approach, the blur film may be separately prepared by contacting a piece of polymer film, which is transparent to the selected wavelength, to the surface of the negative secondary master under heat and pressure, and removing the piece of polymer from the surface of the negative secondary master. This blur film is thereafter affixed to a supporting substrate.

Lenslet features are machined or otherwise placed onto the surface of the primary master tool a single time, and the secondary master is carefully prepared from the primary master by replication. Many secondary masters may be prepared from the primary master. The replication of the secondary master from the primary master tool, or the replication of the polymer film from the secondary master, when this approach is used, allows the replication pressure to be varied, thereby selectively not replicating certain features such as scratches that may be present on the surface of the primary master tool and which, if replicated into the polymer blur film, would adversely affect its performance.

In a one-step variation of this fabrication approach, the texturing or lenslets are introduced directly into the secondary master, and the polymer blur film is replicated from the secondary master. (In this approach, there is no "primary master", but the term "secondary master" is retained for consistency and clarity.) This approach reduces the number of reproduction steps, but requires that the negative of the desired final texturing or lenslets be introduced into the secondary master. Because the secondary master is used regularly in reproduction of the blur films, there is also a greater risk of damaging the secondary master "original". However in some applications the economy achieved through the reduction in the number of required reproduction steps outweighs these disadvantages.

The blur film calibration approach of the invention is applicable to infrared detectors, but not to visible-light detectors or applications. Visible-light detectors such as charge-coupled devices (CCDs) inherently provide a much more uniform signal output when viewing a uniform scene than do infrared FPA detectors, which are subject to changes over time and with use.

The present approach thus provides a technique for controllably blurring a scene to enable the calibration of an infrared focal plane detector array. Performance of the sensor system is improved as a result. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a schematic sectional view of a third blur film assembly;

FIG. 6 is a schematic diagram of the optical paths associated with the presence and the absence of the blur film assembly in the optical path;

FIG. 7 is an elevational view of one arrangement of the lenslets in the blur film assembly, taken generally along line 7—7 of FIG. 3A;

DETAILED DESCRIPTION OF THE INVENTION

Figure 1:
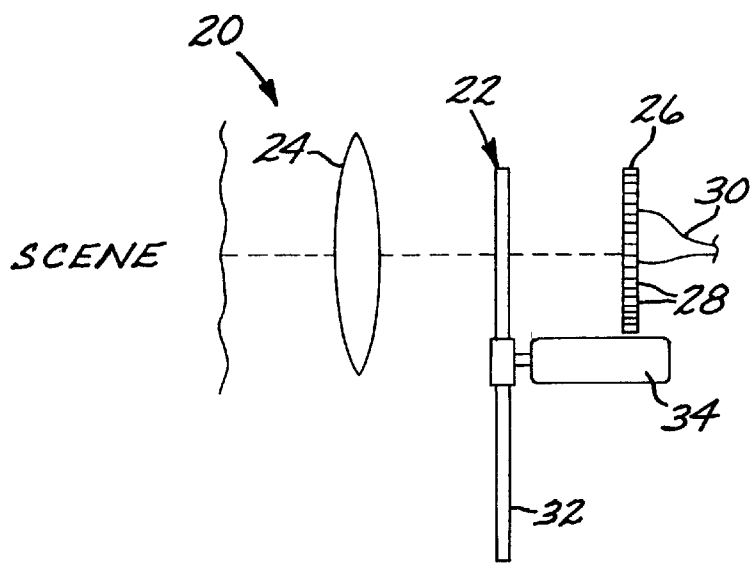
FIG. 1 is a schematic sectional view of an optical system utilizing a focal plane array detector and a blur film.

FIG. 1 depicts an optical system 20 utilizing a blur film assembly 22. The optical system 20 views a scene. An optical group of refractive and/or reflective optical components, here represented schematically by a single lens group 24, focuses the scene onto an infrared focal plane array detector 26 formed of a plurality of detector elements (pixels) 28. The FPA detector elements 28 are electro-optical devices that convert incident infrared energy into an electrical output, which is conveyed to signal processing equipment (not shown) through electrical leads 30. This basic arrangement of elements is operable for viewing the scene using different wavelength ranges (i.e., wavebands) of infrared energy. The lens group 24 is selected to be transparent to the energy wavelength or waveband of interest, and the detector elements 28 are operable to detect the energy wavelength or waveband of interest. The energy wavelengths may include, for example, a relatively broad (broadband) or relatively narrow (narrowband) wavelength range of infrared energy. The elements of the optical system 20 described in this paragraph are all well known in the art for applications of interest. The blur film approach to be discussed subsequently is not known in the art.

Figure 2A:
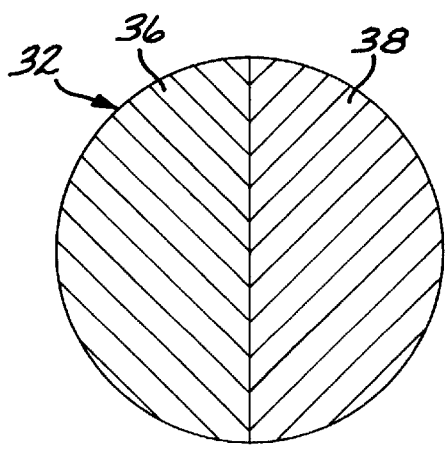
FIG. 2A is an elevational view of a first spatial-filter wheel operable in the optical system of FIG. 1.

The infrared energy from the scene also passes through the blur film assembly 22, which may be positioned so that the energy from the scene passes through the blur film assembly 22 either prior to or after it passes through the lens group 24. In the preferred case, the blur film assembly comprises a spatial-filter wheel 32, in the form of a flat, circular disk that is rotatably driven by a motor 34, with a blur film affixed to a portion of the surface of the spatial-filter wheel. As seen in FIG. 2A, which shows the face of the spatial-filter wheel, the spatial-filter wheel 32 preferably has at least one circumferentially extending sector 36 which includes a blur film having a structure to be described subsequently. At least one circumferentially extending sector 38 is a region which does not include the blur film, and which may be either empty, i.e., an air optical path, or may be filled with a material that is transparent to the energy wavelengths of interest and has a known refractive index.

As the spatial-filter wheel turns, the incident infrared energy from the scene alternatively passes through the blur film sector 36 and the sector 38 which does not have the blur film. When the infrared energy passes through the blur film sector 36, the image on the detector array 26 is blurred, while preserving as much as possible of the total energy of the scene. Calibration of the pixel detector elements, as described previously, is performed during this period of time. When the spatial-filter wheel turns further so that the incident infrared energy passes through the sector 38 that does not have the blur film, the unmodified image of the scene falls upon the detector 26 so that the infrared image is sensed and read. FIG. 2A illustrates the angularly extending sectors 36 and 38 as each comprising 180° of the circumference of the spatial-filter wheel, but the relative angular relation of the sectors may be altered as desired so that the scene is viewed directly by the detector array during a greater or lesser fraction of the total time.

Figure 2B:
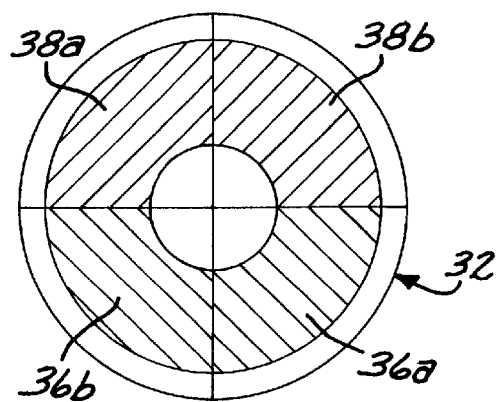
FIG. 2B is an elevational view of a second spatial-filter wheel operable in the optical system of FIG. 1.

In another version of the spatial-filter wheel, additional sectors are provided to enhance the functioning of the spatial-filter wheel. For example, FIG. 2B depicts a spatial-filter wheel 32 which is useful for calibration in two wavebands. A sector 36a includes a blur film operable in a first (e.g., wideband) wavelength range; a sector 38a contains no blur film and has a high transmission for the first wavelength range; a sector 36b includes a blur film for a second (e.g., narrowband) wavelength range; and a sector 38b contains no blur film and has a high transmission for the second wavelength range. The single spatial filter wheel of FIG. 2B thus is useful for calibration in two different wavelength ranges. This principle may be extended to even more wavelength ranges.

The sectors 36 and 38 are illustrated as extending from the hub of the spatial-filter wheel to its rim in FIG. 2A. Equivalently for the present purposes and as illustrated in FIG. 2B, the sectors 36 and 38 may extend over only an annular portion of the radial distance from the hub to the rim, with the rest of the space filled with a material for structural support and/or tooling margin. The sectors 38a, 36a, 38a, and 38b therefore each lie within a circumferentially extending portion of an annulus.

Figure 3A:
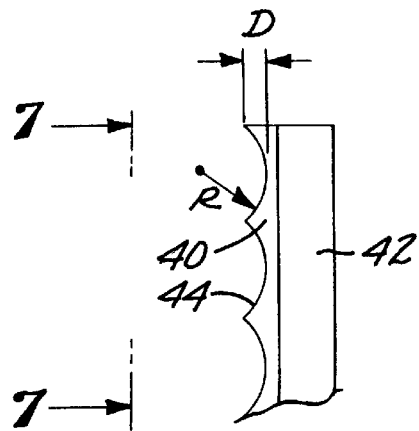
FIG. 3A is a schematic sectional view of a first blur film assembly.
Figure 4A:
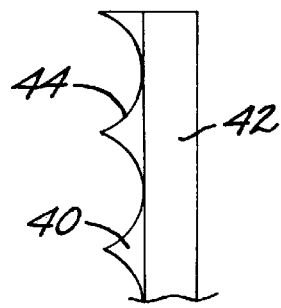
FIG. 4A is a schematic sectional view of a second blur film assembly.

Three embodiments of the structure of the blur film assembly are illustrated in FIGS. 3A, 4A, and 5. Referring to FIG. 3A, a blur film 40 is affixed to one face of a blur film substrate 42. The blur film 40 and the blur film substrate 42 are both transparent to the energy waveband of interest. (The blur film and the blur film substrate must be transparent to infrared energy in the waveband of interest, but they may also be transparent to infrared energy of other wavelengths as well.) The blur film substrate 42 may in turn be affixed to the spatial-filter wheel 32, or it may be the spatial-filter wheel.

The blur film 40 is a film, preferably made of a polymeric material, having a textured surface. The texture preferably is in the form of a plurality of lenslets 44. (As used herein, a lenslet is a preferred form of texture.) Each lenslet is a curved portion of the free surface of the blur film (i.e., the surface not contacting the blur film substrate 42). Each lenslet represents a tiny, individual lens with a curved surface which shifts the focal point of the energy passing therethrough. Taken collectively, an array of lenslets effective diffuses scene energy and filters high spatial scene frequency content. The curved portion of the lenslet comprises a locally curved surface-of-revolution.

Figure 3B:
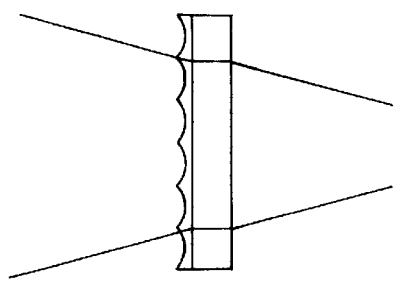
FIG. 3B is a schematic diagram of the optical path associated with the first blur film assembly.
Figure 4B:
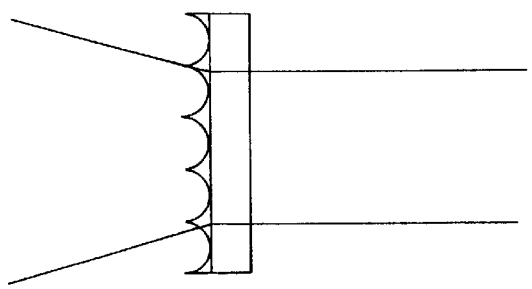
FIG. 4B is a schematic diagram of the optical path associated with the second blur film assembly.

The surface-of-revolution of each lenslet 44 is preferably semi-spherical in shape. That is, the surface of each lenslet is preferably a sector of a sphere, but not necessarily a hemisphere. The radius of curvature R of the sphere sector and the depth D of the sphere sector in the blur film are fabrication parameters that may be varied in a manner to be discussed subsequently. Where R is relatively large and D/R is relatively small, as in FIG. 3A, the lenslets have a relatively shallow wall angle (inclination). The resulting ray path of incident energy is illustrated in FIG. 3B. Where R is relatively small and D/R is relatively large, as in FIG. 4A, the lenslets have a relatively steep wall angle. The incident energy is less convergent than for the case illustrated in FIG. 3B, as shown in FIG. 4B.

In another variation, different polymer films 40a and 40b, with different lenslet structures 44a and 44b, may be placed on the opposite sides of the substrate 42, as illustrated in FIG. 5. This arrangement can further increase the blurring effect of the blur film assembly. The approach of FIG. 5 can also be used with the same lenslet structure placed on the opposite sides of the substrate.

Thus, by varying the materials of construction (which determines the basic refractive indices of the polymer film and the substrate), the fabrication parameters of the polymer film such as lenslet radius of curvature R and depth D, the spacing S between lenslets, the arrangement of the lenslets in relation to each other (discussed subsequently in relation to FIG. 7), and the selection of one or two polymer films, the optical designer may establish a convergence of the incident infrared energy beam after it passes through the blur film assembly 22. Stated alternatively, the optical designer has the ability to vary the focal position of the image produced by each lenslet, and hence the extent of blurring, over wide ranges, by selecting particular values for these factors. The blurring is therefore established so as to achieve sufficient blurring so as to remove discrete features from the scene in the blurred image, but not to achieve so great a blurring that would cause the blurred image to significantly extend beyond the lateral extent of the detector 26 so that excessive energy is lost.

FIG. 6 illustrates the focusing/defocusing effect of the blur film assembly. When no blur film assembly 22 is present, the lens group 24 focuses the infrared image of the scene onto the surface of the detector array 26, which is placed at the focal plane of the lens group. When the blur film assembly 22 is inserted into the energy path, as illustrated, the lenslets roughly focus the infrared energy from the scene to a "defocused" focal surface 46 that is displaced from the focal plane of the detector 26. Accordingly, the image at the detector array 26, when the blur film assembly is in place, is defocused and blurred. The degree of blurring is established by varying the parameters of construction of the blur film assembly, as discussed above in relation to FIGS. 3–5.

Another fabrication parameter of the blur film assembly is the two-dimensional geometrical arrangement of the lenslets. FIG. 7 is a view of the face of one embodiment of the blur film 40, showing the two-dimensional geometrical arrangement of the lenslets 44. In this case, the lenslets 44 are arranged in a regular hexagonal pattern that fills the two-dimensional space entirely (a "close-packed" structure). Such a regular array, in the form of a hexagon, a square, or other regular form, is presently preferred. However, studies by the inventors have demonstrated that satisfactory blurring for some scene conditions may be achieved when the array of lenslets is nonuniform.

Figure 8:
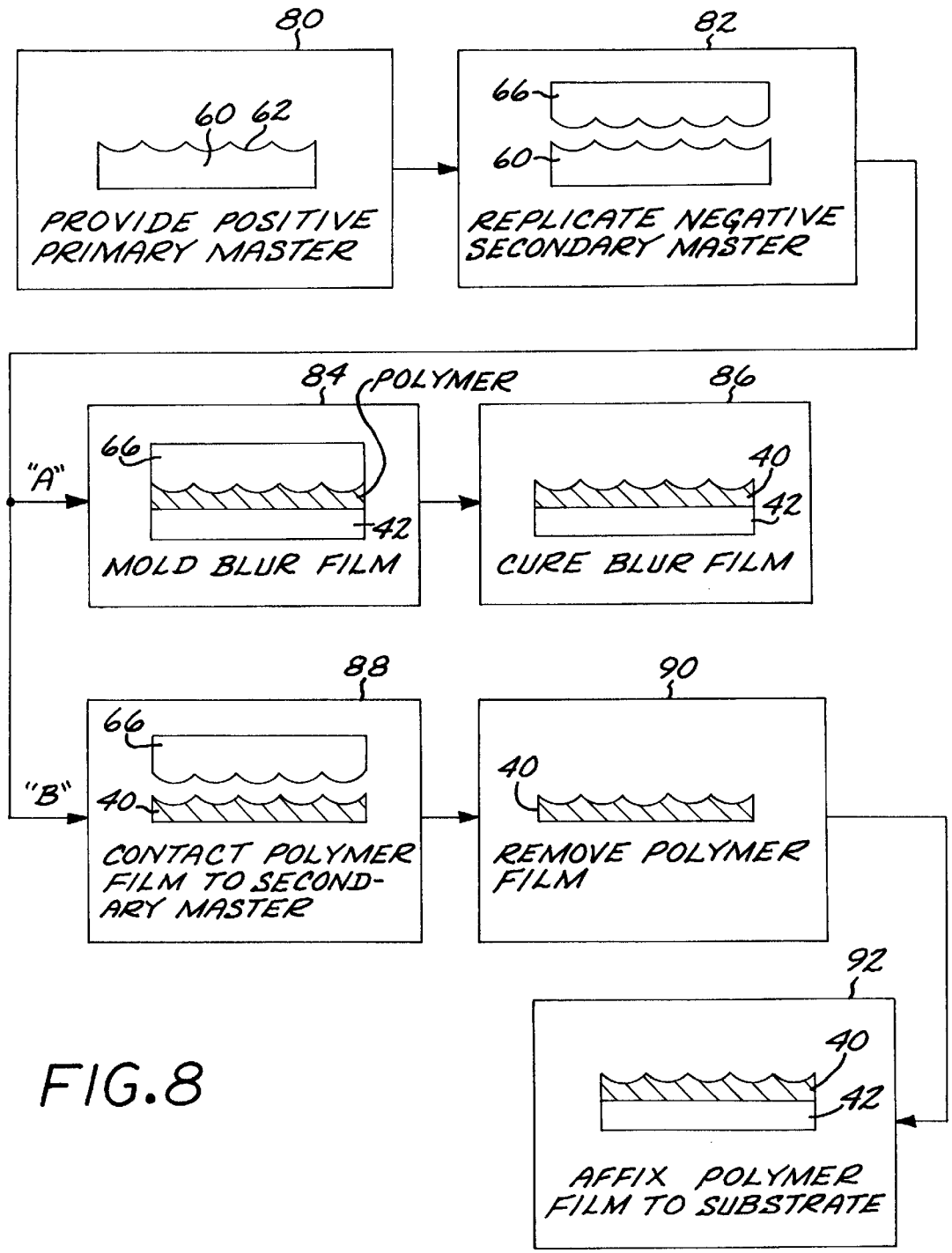
FIG. 8 is a pictorial flow diagram of an approach for fabricating a blur film assembly.

FIG. 8 is a pictorial flow diagram of two preferred approaches for preparing the blur film assembly 22 having a lenslet surface. A positive primary master tool 60 is prepared and provided, numeral 80. The positive primary master tool 60 has a surface configuration that defines the lenslet surface configuration of the final blur film. That is, a pattern of lenslet features 62 on the surface of the primary master 60 result in, by a replication process to be described, the pattern of lenslets 44 on the blur film 40. Only one primary master tool is prepared, and therefore great care may be taken to fabricate it precisely.

Figure 9:
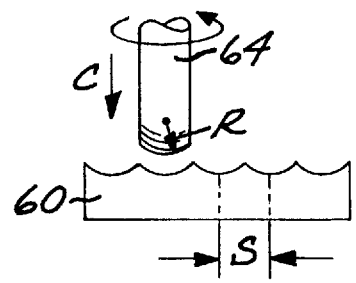
FIG. 9 is a schematic sectional view of a preferred technique for forming lenslet features on the primary master.

The preferred approach for forming the lenslet features 62 in the primary master tool 60 is illustrated in FIG. 9. An end mill 64 with an end shape corresponding to the desired shape of the lenslet features 62 (and thence the lenslets 44) is used to mill the lenslet features 62 into the upper surface of the tool blank that is used to form the primary master tool. For example, the end of the end mill 64 may be hemispherical with radius R, so that the lenslet features 62 are all sectors of a sphere. The radius R of the end mill and the spacing S between the cuts determines the depth D of the sphere sector in the lenslets 44. The array pattern (as shown in FIG. 7) of the lenslet features is determined by the location at which each cut by the end mill is made. Care is taken so that, desirably, there are no flat spots between the individual lenslets, which would reduce the blurring of the transmitted energy. By furnishing an end mill with the desired radius of curvature R, controlling the spacing S, and moving the end mill to the desired locations to form the array of lenslets, a wide range of lenslet types and patterns may be produced. This operation is readily performed with a conventional numerically controlled milling machine. After the pattern is produced, it may be polished mechanically or chemically, plated, or otherwise treated to improve durability, corrosion resistance, and surface quality.

Alternatively, the pattern in the primary master (or in the secondary master in the one-step replication procedure described subsequently) may be formed by other techniques such as ion or electron milling, or photolithographic microelectronic techniques.

Figure 10:
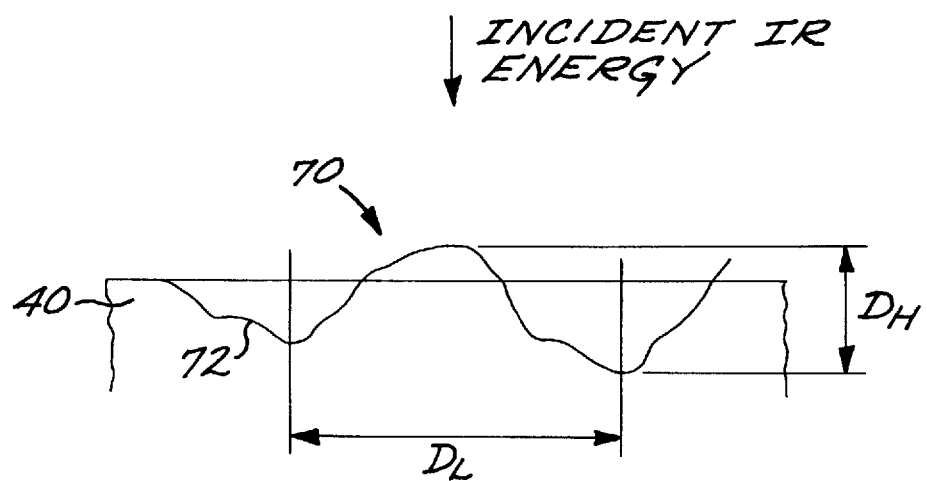
FIG. 10 is a schematic sectional view through a more general form of a textured surface.

The blur film 40 may have a texture 70 which is not a pattern of lenslets, but is instead a pattern of peaks and valleys extending across the surface of the blur film. FIG. 10 illustrates such a texture 70 in section. Here, instead of lenslets, there is a regular or irregular (as shown) pattern of peak-and-valley features 72 in the surface of the blur film 40. These features 72 have a peak-to-peak amplitude $D_H$ (in the direction perpendicular to the surface of the blur film 40) and a lateral dimension $D_L$ (in a direction parallel to the surface of the blur film) that are each no less than the midpoint wavelength of the waveband of incident infrared energy to be processed and blurred. These dimensions permit the texture to achieve the required diffusion of the infrared energy. The textured blur film of FIG. 10 provides a degree of blurring performance, but the blurring is less effective and controlled than the blurring achieved with the preferred lenslets.

A negative secondary master 66 is replicated from the positive primary master, numeral 82. The replication is preferably performed by one of two techniques. In the press method, a piece of the material that is to form the secondary master 66 is pressed into the surface of the primary master tool 60, typically at elevated temperature so as to assist in the forming of the piece of material to the surface of the primary master tool. The preferred material for the secondary master is a low-surface-energy polymer such as polyethylene or polytetrafluoroethylene. In the molding method, a liquid material may be used as the starting point for the secondary master. The liquid material is applied to the surface of the primary master tool 60 having the lenslet features 62, at elevated temperature and under pressure, allowed to harden, and then stripped off.

With either approach, the negative of the features on the surface of the primary master tool 60 is replicated onto the secondary master 66. That is, a "valley" on the primary master tool becomes a "hill" on the secondary master. It may be necessary only to replicate a single secondary master 66, or larger numbers may be required for larger production operations. All of the secondary masters will be identical negative copies of the primary master, provided that the same replication process is used and that no wear or damage occurs to the primary master tool. If a secondary master is damaged or becomes worn, a replacement may be made from the primary master tool.

The negative secondary master 66 is used to make the positive polymer blur film 40, numeral 84. In the preferred approach, path A of FIG. 8, the features of the second master 66 are replicated directly onto the surface of the spatial-filter wheel, which serves as the substrate 42. The secondary master 66 is placed against the wheel substrate and a liquid polymer, having suitable infrared transparency, is injected between the surfaces of the wheel substrate and the secondary master, numeral 84. The liquid polymer is cured and the secondary master is removed, numeral 86, leaving the spatial-filter wheel 32 with the final blur film 40 applied and bonded thereto. This replication produces a blur film 40 having features which are a negative of the secondary master, but which are of the same sense as the surface features of the primary master tool.

The blur film may also be made from the secondary master 66 as a separate article, see path B of FIG. 8. In this approach, a piece of solid polymer film is placed onto the surface of the negative secondary master 66, numeral 88. (In frame 88 of FIG. 8, the elements are illustrated as being slightly separated for clarity, but in actuality they are pressed together to perform the replication.) The polymer film is pressed against the surface of the negative secondary master 44, optionally with the application of a small increase in temperature so as to cause the film to flow slightly, so that the features of the secondary master 44 are replicated onto the surface of the polymer film. The replication results in the features being positive on the surface of the polymer film. The polymer film 40 is removed (stripped) from the secondary master 66, numeral 90. The polymer film 40 may be used in this stripped form, but it is quite fragile and deformable. More preferably, it is adhered to the blur film substrate 42, which supports the blur film 40 and holds it in the proper position and orientation for use, numeral 92. The assembly of blur film and substrate is readily handled and used. For the preferred application such as that of FIG. 1, the blur film/substrate assembly is the spatial-filter wheel 32 or is fixed to the surface of the spatial-filter wheel.

In either approach, the polymer blur film is desirably sufficiently thick that its back side remains planar, while the front side replicates the features from the secondary master. On the other hand, the blur film should be no thicker than necessary to replicate the features of the lenslets properly, so that the transmitted energy is not unnecessarily attenuated.

By these approaches, the features from the positive primary master 60 are inexpensively and controllably reproduced to the polymer material that becomes the blur film 40. However, the present approach permits some features of the primary master tool to be suppressed so that they do not appear on the secondary master and in the final blur film. Even with careful machining and polishing of the primary master tool, there may be small scratches, much smaller than the dimensions of the lenslets, on its surface. By varying the pressure when the secondary master is pressed against the primary master tool (step 82 of FIG. 8), and when the blur film is pressed against the secondary master (in step 88 of path B of FIG. 8), the replication of very fine features may be avoided. Typically, the greater the pressing pressure or the temperature, the smaller the features that are replicated as the material flows into the features. By using the lowest pressures satisfactory to replicate the desired lenslet features, smaller features such as scratches are suppressed.

The surface of the secondary master need not be an exact copy of the primary master tool. For example, if the heat, pressure, or time are sufficiently reduced when replicating the second master from the primary master tool, a partial or "reduced" replication may result. Minimizing the replication time may be desired to facilitate production throughput. In these cases, the resilience of the polymer material comprising the secondary master may cause it to spring back upon completion of the replication. This effect may result in reduced pattern/lenslet depth. Reduced replication may be desirable depending upon the intended optical blurring required, the production throughput required, or the need to suppress scratches or other features on the surface of the primary master.

The present fabrication may also be practiced using only steps 82, 84, 86, 88, 90, and 92 of FIG. 9 (i.e., omitting step 80). In this one-step replication procedure, the secondary master 66 is prepared with a surface having the negative of the desired features of the blur film 40, and the process otherwise proceeds as illustrated. This approach reduces the number of processing steps but places the secondary master more at risk to damage.

The present invention has been reduced to practice for an infrared optical system 20. In manufacturing the blur film assembly by the method of FIG. 8, path A, the primary master was machined from brass or aluminum. The lenslet features were formed on the primary master in either a hexagonal close-packed pattern or a square close-packed pattern. Each lenslet had a semi-spherical surface with a radius R, depth D, and spacing S. The secondary master was a solid piece of either polyethylene or polytetrafluoroethylene, but other low-surface-energy polymers such as polypropylene, delrin, or fluorinated ethylene-propylene may be used. The secondary master was pressed against the primary master at a temperature of about 220° F., with a pressing pressure of about 1555 pounds per square inch, and for a time of about 30 minutes. The blur film was made of high infrared-transmission silicone resin such as modified Castall S-1332, but other polymers having suitable infrared transmission may be used. The blur film was adhered to an spatial-filter wheel made of silicon or zinc sulfide and having an anti-reflective coating thereon.

A number of blur film assemblies, integral with spatial-filter wheels, were prepared using this approach, according to the following geometrical parameters:

| Array Shape | Spacing of Lenslets(in) | Radius of Lenslet(in) | Depth of Lenslet(in) |
|---|---|---|---|
| hexagonal | 0.020 | 0.040 | 0.0017 |
| hexagonal | 0.040 | 0.080 | 0.0034 |
| square | 0.020 | 0.040 | 0.0026 |
| square | 0.040 | 0.080 | 0.0052 |

The spatial-filter wheels produced by this approach were incorporated into the optical system 20 and tested for adaptive calibration of the focal plane array detector. Excellent results were obtained, as evidenced by a reduction in noise and elimination of video artifacts in the output signal of the focal plane array detector. In addition, other blur film textures, including randomly textured surfaces, were also tested with much improved results as compared with the baseline optical design.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A blur film assembly, comprising:
    a blur film made of a film material transmissive to a selected waveband of incident infrared energy, the blur film having a surface texture thereon comprising a pattern of peak-and-valley features having an amplitude in the direction perpendicular to the surface of the blur film and a lateral dimension parallel to the surface of the blur film that are each no less than a midpoint wavelength of the selected waveband of incident infrared energy.

2. The blur film assembly of claim 1, wherein the peak-and-valley features are lenslets.

3. The blur film assembly of claim 1, further including a substrate made of a substrate material transmissive to infrared energy of the same selected infrared waveband as the blur film, wherein the blur film is affixed to a surface of the substrate.

4. The blur film assembly of claim 3, further including a spatial-filter wheel to which the blur film is affixed, the spatial-filter wheel having a circumferentially extending first sector covered by the blur film and a circumferentially extending second sector not covered by the blur film.

5. A blur film assembly, comprising a blur film made of a film material transmissive to a selected waveband of infrared energy, a surface of the blur film comprising a plurality of lenslets, wherein each lenslet comprises a surface shaped as a surface of revolution.

6. The blur film assembly of claim 5, wherein the plurality of lenslets comprise a regular array of lenslets.

7. The blur film assembly of claim 5, wherein the film material is a polymer.

8. The blur film assembly of claim 5, further including a substrate made of a substrate material transmissive to infrared energy of the same selected infrared waveband as the blur film, wherein the blur film is affixed to a surface of the substrate.

9. The blur film assembly of claim 8, further including a spatial-filter wheel to which the blur film is affixed, the spatial-filter wheel having a circumferentially extending first sector covered by the blur film and a circumferentially extending second sector not covered by the blur film.

10. A blur film assembly, comprising:

a blur film made of a film material transmissive to energy of a selected infrared waveband, the film having a plurality of lenslets thereon, each lenslet comprising a locally curved surface of revolution;

a support to which the blur film is affixed to form a spatial-filter wheel, the spatial-filter wheel having a circumferentially extending first sector covered by the blur film and a circumferentially extending second portion not covered by the blur film; and a rotational drive affixed to the spatial-filter wheel.

11. The blur film assembly of claim 10, further including a detector for energy of the selected infrared waveband, and wherein the spatial-filter wheel is positioned between the detector and an infrared energy source.

12. The blur film assembly of claim 10, wherein the blur film material is a polymer.

13. The blur film assembly of claim 10, wherein the plurality of lenslets comprise a regular array of lenslets.

14. The blur film assembly of claim 10, wherein each lenslet comprises a surface of revolution.

* * * * *